No. 751,232. PATENTED FEB. 2, 1904.
C. G. W. WERNICKE.
BAND CUTTER AND FEEDER FOR CORN HUSKERS.
APPLICATION FILED MAY 19, 1902.
NO MODEL. 5 SHEETS—SHEET 1.

Witnesses.
Inventor.
Carl G. W. Wernicke
By his Attorneys
Williamson & Merchant

No. 751,232. PATENTED FEB. 2, 1904.
C. G. W. WERNICKE.
BAND CUTTER AND FEEDER FOR CORN HUSKERS.
APPLICATION FILED MAY 19, 1902.

NO MODEL. 5 SHEETS—SHEET 4.

Witnesses,
H. D. Kilgore,
A. H. Opsahl.

Inventor
Carl G. W. Wernicke
By his Attorneys
Williamson & Merchant

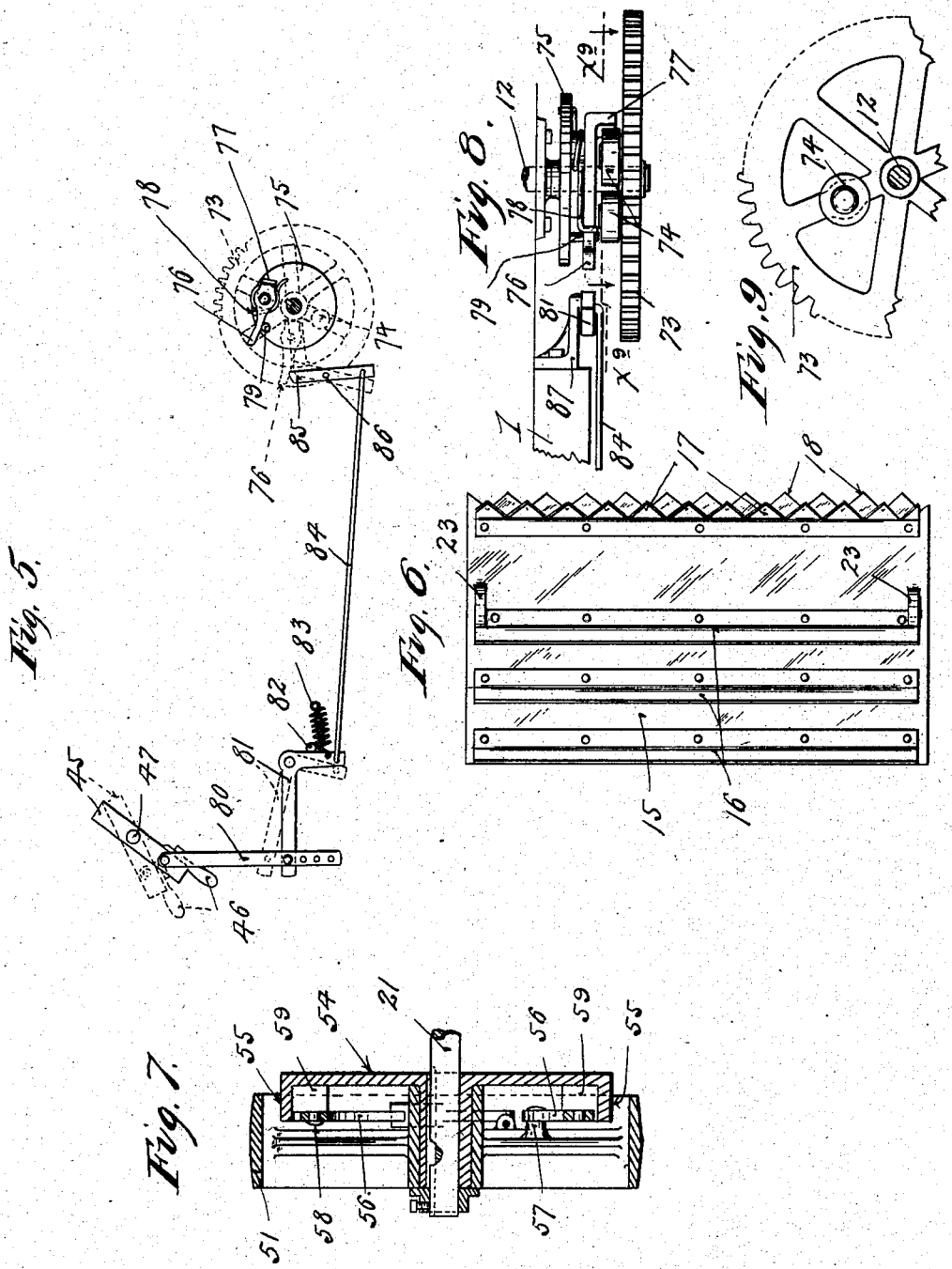

No. 751,232. Patented February 2, 1904.

UNITED STATES PATENT OFFICE.

CARL G. W. WERNICKE, OF MANKATO, MINNESOTA.

BAND-CUTTER AND FEEDER FOR CORN-HUSKERS.

SPECIFICATION forming part of Letters Patent No. 751,232, dated February 2, 1904.

Application filed May 19, 1902. Serial No. 107,942. (No model.)

*To all whom it may concern:*

Be it known that I, CARL G. W. WERNICKE, a citizen of the United States, residing at Mankato, in the county of Blue Earth and State of Minnesota, have invented certain new and useful Improvements in Band-Cutters and Feeders for Corn-Huskers; and I do hereby declare the following to be a full, clear, and exact description of the invention, such as will enable others skilled in the art to which it appertains to make and use the same.

My present invention has for its object to provide an improved band-cutter and feeder for corn-huskers and corn-huskers and shredders; and to this end it consists of the novel devices and combinations of devices hereinafter described, and defined in the claims.

The invention is illustrated in the accompanying drawings, wherein like characters indicate like parts throughout the several views.

Figure 1:
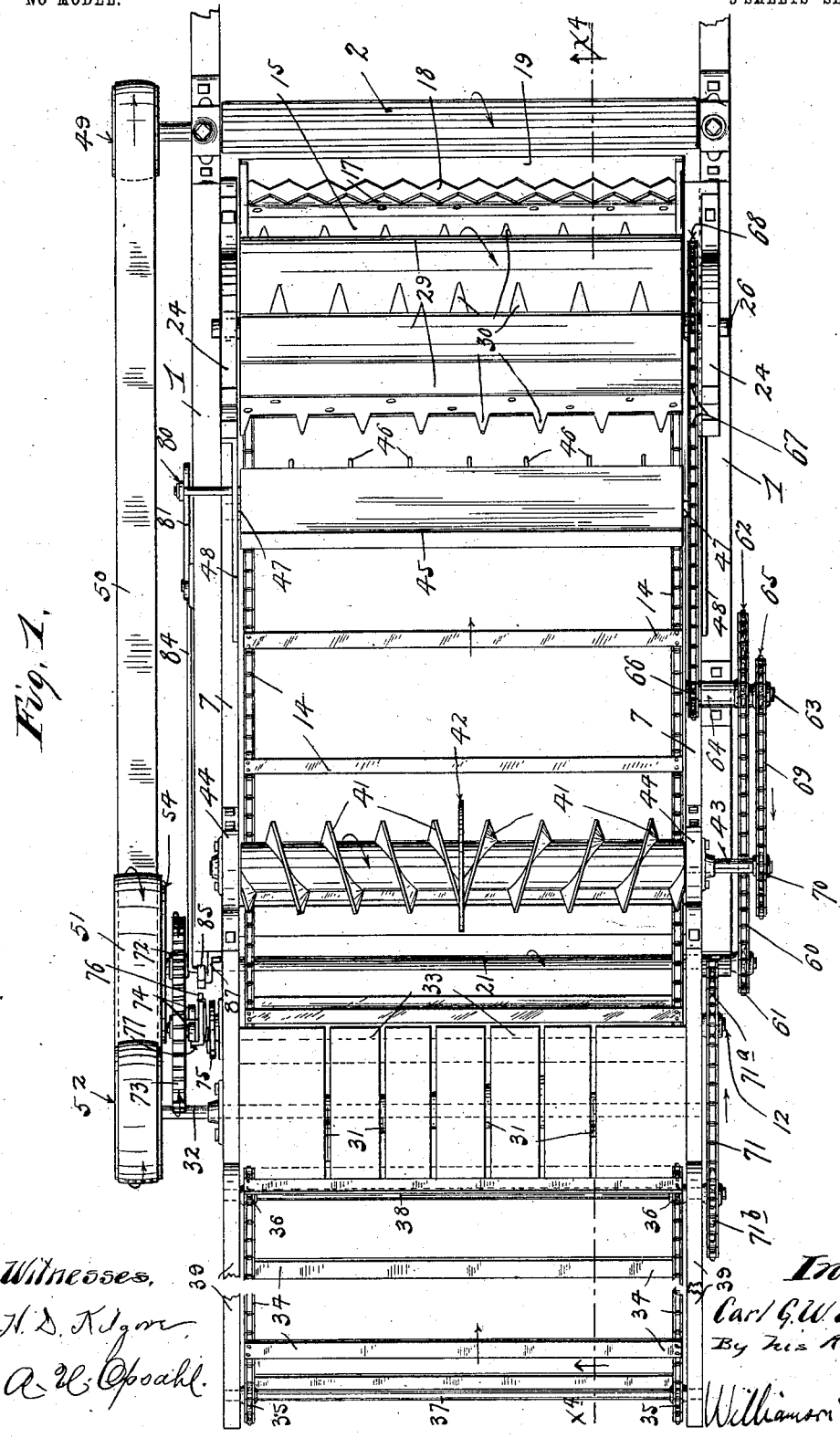
Figure 2:
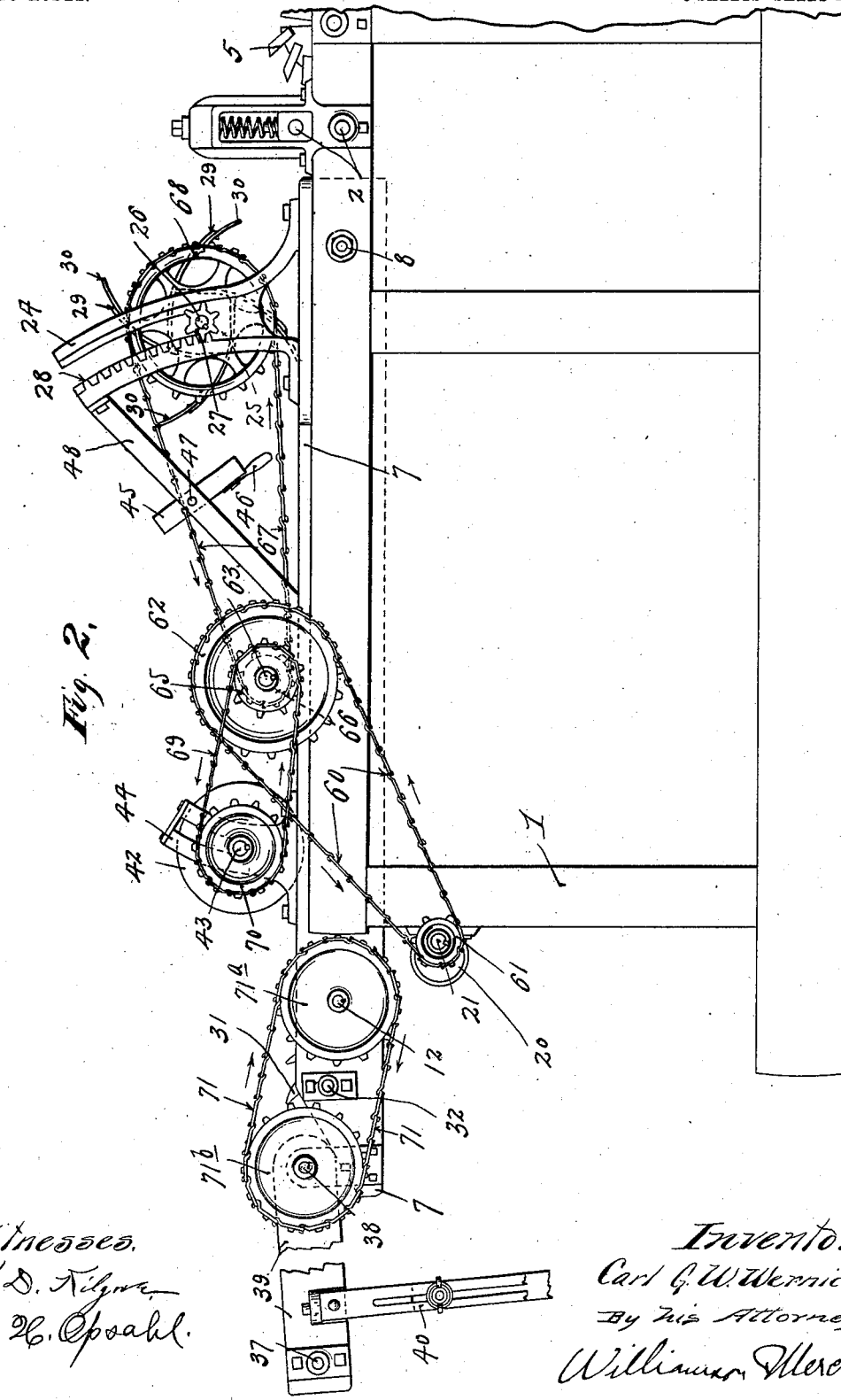
Figure 3:
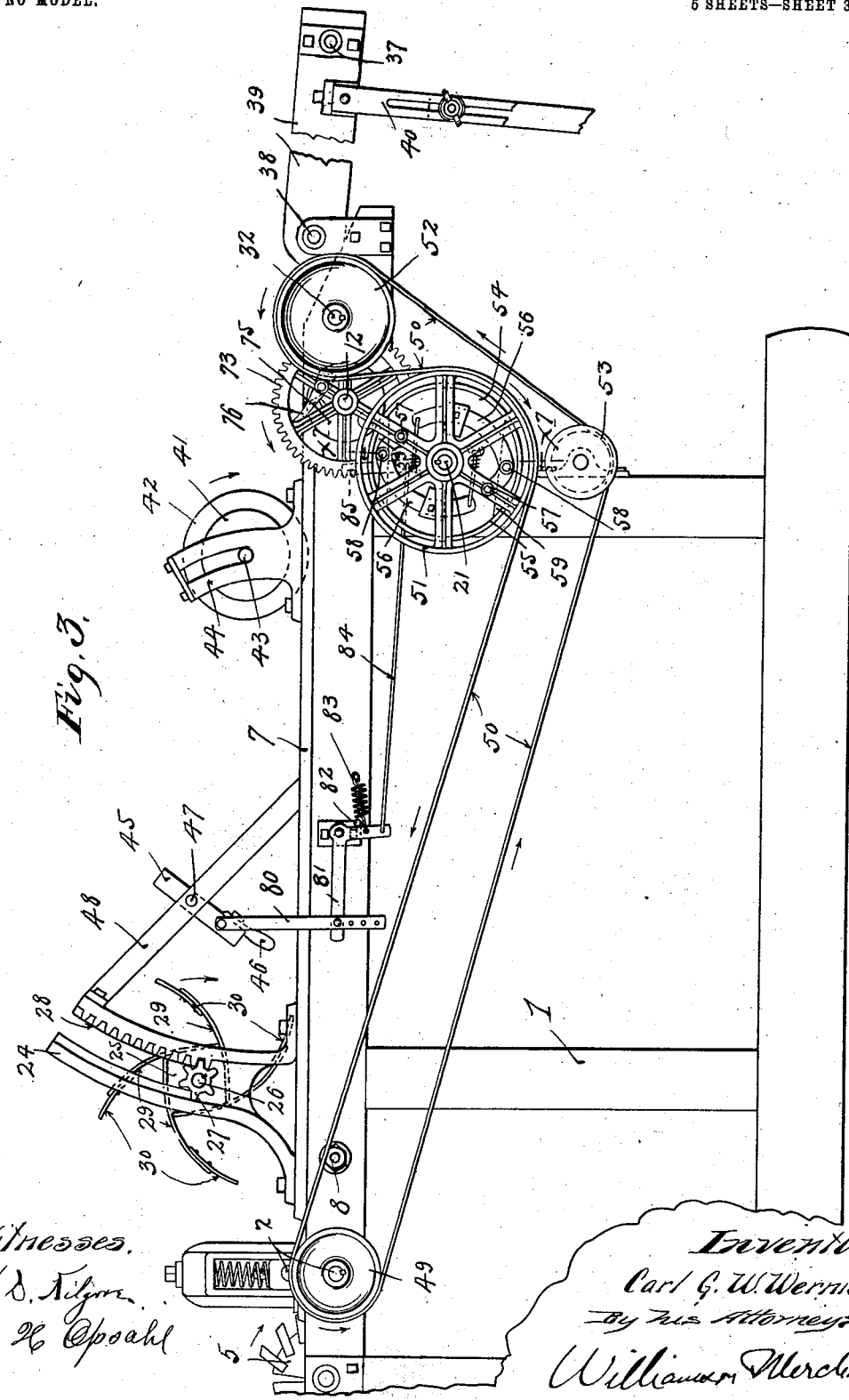
Figure 4:
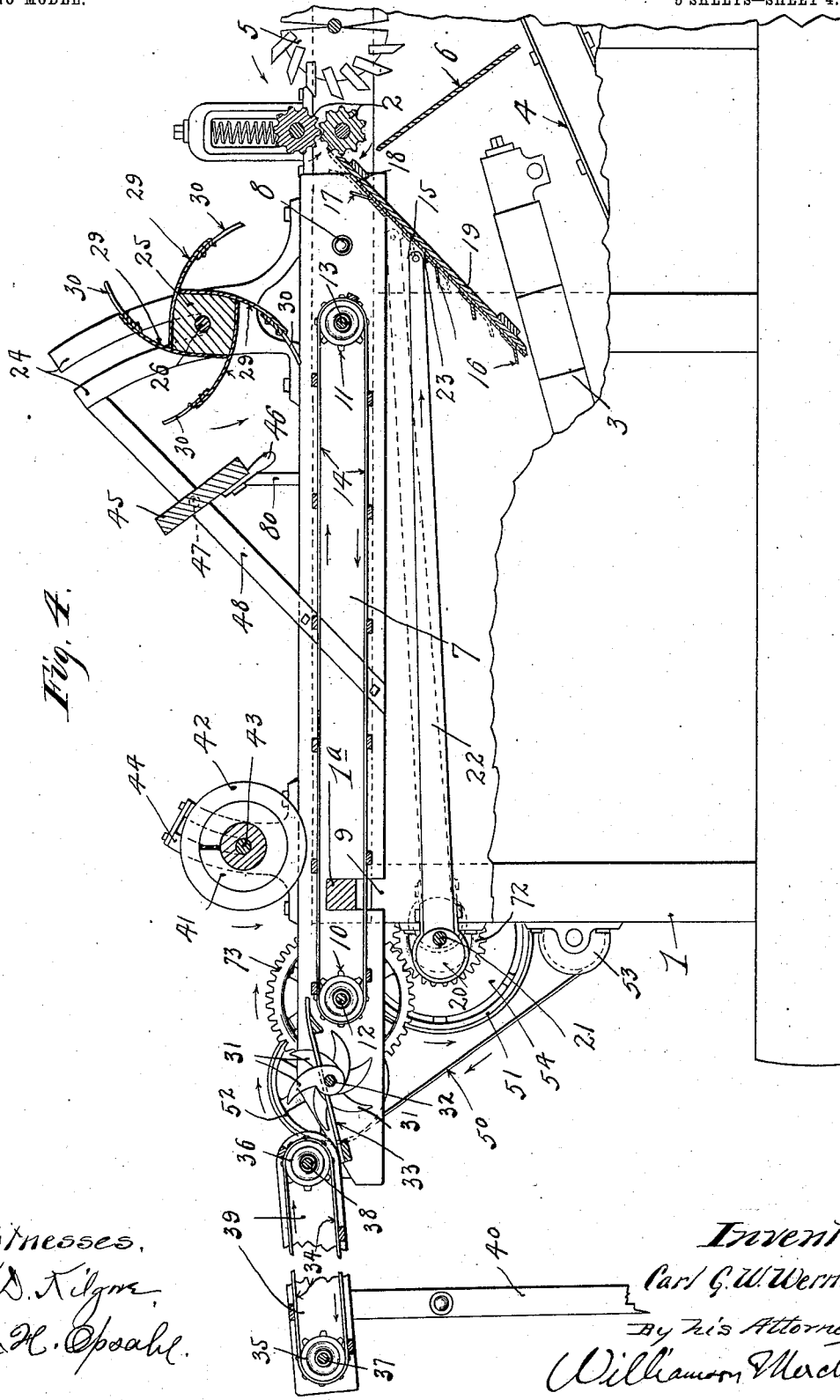

Figure 1 is a plan view of my improved band-cutter and feeder, showing also portions of a corn-husker and shredder. Fig. 2 is a view in right side elevation of the parts shown in Fig. 1. Fig. 3 is a view in left side elevation, illustrating the parts shown in Figs. 1 and 2. Fig. 4 is a vertical section on the line $x^4 x^4$ of Fig. 1. Fig. 5 is a detail view, partly in section and partly in diagram, showing the so-called "stalk-governor" and clutch mechanism actuated thereby. Fig. 6 is a plan or face view of the so-called "throat-clearing plate." Fig. 7 is a section through a governor-controlled friction-clutch and coöperating driving-pulley, taken on the line $x^7 x^7$ of Fig. 3. Fig. 8 is an enlarged plan view of the clutch which is controlled by the stalk-governor; and Fig. 9 is a section approximately on the line $x^9 x^9$ of Fig. 8, some parts being broken away and others being removed.

Of the parts of the husker and shredder illustrated the numeral 1 indicates the framework, the numeral 2 the snapping-rollers, 3 the husking-rollers, 4 the husk-elevator, 5 the shredder, and 6 an inclined deck extending rearward from below the snapping-rollers 2.

The band-cutter and most of the parts of the feeder are mounted on a supplemental frame comprising a pair of heavy beams 7, bolted at 8 to the sides of the frame 1 and notched at 9 for engagement with a transverse beam $1^a$ of said frame 1. In this way the said supplemental frame is made readily detachable.

Working over sprockets 10 and 11, carried, respectively, by shafts 12 and 13, journaled in the supplemental frame 7, is an endless slat-and-chain conveyer or feed-belt 14. The sprockets 11 are so located with respect to the snapping-rollers 2 that a large throat is formed between the same, through which the ears are dropped onto the husking-rollers. The stalks must of course project from the feed-belt 14 across this throat to the snapping-rollers, and in prior machines great annoyance has been caused by the projecting ends of these stalks being bent downward and clogging this throat, so that the ears would not freely drop to the husking-rollers.

As one feature of my invention I provide a throat-clearing device which serves both to positively force and feed the ends of the stalks upward into line with the snapping-rollers and to rake the ears downward onto the husking-rollers, this device preferably comprising a thin imperforate plate 15, provided with several downturned smooth-edged cleats 16 and provided at its upper edge with an upturned serrated cleat 17, the upper edge of the said plate being also preferably serrated, as shown at 18. (See Fig. 6.) This clearing-plate 15 receives a reciprocating motion at an angle of approximately forty-five degrees to a perpendicular over a fixed bearing-plate 19, suitably secured, preferably, to the machine-frame 1. The reciprocating motion is imparted to the clearing-plate 15 from a pair of eccentrics 20, carried by a counter-shaft 21, mounted in suitable bearings on the machine-frame 1, which eccentrics operate a pair of eccentric-straps 22, pivotally connected at their inner ends, preferably, to lugs 23 on the said plate 15. Under the reciprocating movements of the clearing-plate 15 the serrated bar 17 and also the serrated edge 18 catch and force upward the butt-ends of the cornstalks, thereby delivering the same between the snapping-rollers, while the downturned cleats 16 act on the ears of the corn to accelerate and insure their downward movement to the husking-rollers 3.

Mounted in segmental guide-brackets 24, secured one to each beam of the supplemental frame 7, is a so-called "beater," the body 25 of which is preferably rectangular in cross-section and the loose shaft 26 of which is provided with pinions 27, which mesh with teeth 28 on said brackets 24, and thereby impart parallel rising and lowering movements to the said beater—that is, maintain the same always in a horizontal position. To each face of the body 26 is secured a wing or plate 29, which projects nearly tangentially, but is preferably curved slightly backward with respect to the direction of rotation of the beater. To the edges of the beater plates or wings 29 are secured stripper-teeth 30, which act directly upon the stalks to strip the lower stalks of a bundle from the upper ones—that is, to accelerate their movement toward the snapping-rollers and prevent too large a number of stalks from being presented to the said rollers at one time. As the beater is free to rise and fall, it will adapt itself to any thickness of the layer of stalks, and as it is held for horizontal movement it will have an equal feeding action from end to end.

The band-cutter preferably comprises a plurality of knives 31, carried by a counter-shaft 32, suitably mounted in the sides of the supplemental frame 7 rearward of the sprockets 10 of the feed-belt 14. These knives work through slits cut in a short table 33, suitably secured to the sides of the supplemental frame 7.

An endless conveyer, preferably comprising a slat-and-chain belt 34, runs over sprockets 35 and 36, carried, respectively, by shafts 37 and 38, mounted in a folding frame 39. The frame 39 is pivoted to the sides of the supplemental frame 7 by means of the shaft 38 and is adapted to be supported in an operative position by means of a folding leg 40. When the machine is not in use, the frame 39 is adapted to be folded or turned pivotally upward and back over the top of the supplemental frame 7. The conveyer 34, as is evident, affords a central or end feed device onto which the bundles of cornstalks are thrown; but it will of course be understood that transversely-movable side conveyers might be added thereto for feeding the stalks from both sides.

A spiral spreader is mounted to work over the intermediate portion of the feed-belt 14, preferably near the receiving end thereof. This spiral spreader 41 has spiral flanges or webs which extend the one with a right and the other with a left hand twist or screw in reverse directions from the center of the body of said spreader. The body of the spreader is provided at its central portion—to wit, where the reversely-extending spiral webs unite—with a thin dividing-disk 42. The shaft 43 of said spreader projects at its ends and works freely for rising and falling movements in segmentally-extended seats or slots of a pair of segmental guide-brackets 44, rigidly secured one on each beam of the supplemental frame 7. As this spreader is free to rise and fall or float, as it were, on top of the stalks, it will of course adapt itself to a load of stalks of any thickness, and under rotary motion imparted to the same the disk 42 will separate the bundle at the middle and the reversely-wound spiral sections of the spreader will simultaneously spread out in opposite directions and toward the side of the machine the two halves of such bundle or pile of stalks. This spiral spreader I consider to be broadly new, and hence, of course, it may take various forms, although I believe the form shown and described will accomplish by far the best results.

Working over the feed-belt or conveyer 14, preferably just to the rear of the beater, already described, is mounted a so-called "tripping" comb or blade 45, having depending laterally-spaced teeth 46 and which afford an automatic stalk-governor or regulating-gate. As shown, the trunnions 47 of this comb 45 are pivoted in supporting-bars 48, connected at their lower ends to the sides of the supplemental frame 7 and at their upper ends to the guide-brackets 24. By means of connections presently to be described this comb 45 when its lower portion is rocked forward or in the direction of the feed beyond a predetermined point will trip out of action the feed-belts or conveyers 14 and 34, and the stalk-governor regulator and gate, which is made adjustable, will come into action, holding the top stalks back, while the beater feeds the lower ones to the snapping-rollers.

Motion is imparted to the snapping-rollers 2 in the ordinary way, and, as shown, all of the running parts of my attachment receive motion from the pulley 49, carried by the shaft of one of the said rollers 2. A belt 50 runs over the pulley 49, over a pulley 51 on the eccentric-equipped shaft 21, over a pulley 52 on the shaft 32 of the band-cutter, and over an idle pulley 53, suitably mounted on one side of the frame 1. The pulley 51 in the construction illustrated is loosely mounted on the hub of a friction-wheel 54, which in turn is keyed to the shaft 21 and is provided with the profile flange 55.

The numeral 56 indicates weighted spring-pressed governor-levers, which are pivoted at 57 to the pulley 51 and are pivoted at 58 to shoes 59, which as long as the pulley 51 is given the predetermined speed are under the action of centrifugal force on the levers 56 frictionally pressed against the flange 55 of the wheel 54, so that motion will be imparted to the shaft 21, eccentrics 20, and other parts driven therefrom.

As best shown in Fig. 2, but also in Fig. 1, the beater, the spreader, and the receiving-apron 34 receive motions directly through the following connections.

The numeral 60 indicates a sprocket-chain which runs over a small sprocket 61 on the shaft 21 and over a relatively large intermediate sprocket 62, keyed to a short shaft 63, suitably mounted in the bearings 64 on one side of the frame 1. At its outer end the shaft 63 is provided with a small sprocket 65, and at its inner end it is provided with a similar sprocket 66. A sprocket-chain 67 runs over the sprocket 66 and over a large sprocket 68, secured to one end of the body 26 of the beater.

69 indicates a sprocket-chain which runs over the sprocket 65 and over a sprocket 70, secured to one end of the shaft 43 of the spreader.

71 indicates a sprocket-chain which runs over a sprocket 71$^a$ on one end of the feed-belt shaft 12 and over a similar sprocket 71$^b$ on one end of the feed-belt shaft 38.

At one end adjacent to the clutch-wheel 54 the shaft 21 carries a spur-gear 72, which meshes with a similar spur-gear 73, which is loosely mounted on the projecting end of the feed-belt shaft 12, as best shown in Figs. 1, 5, 8, and 9. The loose gear 73 carries one or more, preferably two, driving rollers or lugs 74.

Keyed to the shaft 12 adjacent to the wheel 73 is a disk 75, to which is pivoted a clutch-dog 76, provided at one end with a projecting tailpiece and at its other end with a laterally-projecting driving-lug 77. The dog 76 is subject to a spring 78, which normally yieldingly holds the same against a stop 79, carried by said disk 75. When the pawl 76 is thus left in its normal position, one or the other of the rollers or lugs 74 of the wheel 73 will engage the driving-lug 77 of said dog, and hence impart positive rotary movement to the shaft 12 of the feed-belts 14.

A depending link 80 is pivotally connected to the tripping-comb 45 at one end thereof at a point offset from its trunnions 47. The lower end of this link 80 is adjustably pivoted to one arm of a bell-crank 81, which is pivoted to one side of the machine-frame 1, and is normally held against the stop 82 by a spring 83. The depending end of the bell-crank 81 is connected by a rod 84 to the depending end of a dog-tripping stop 85, which is pivoted at 86 to a bracket 87, secured on one side of the machine-frame 1. When the tripping-comb 45 stands in its normal position, (indicated by full lines in Figs. 2, 4, and 5,) the upper end of the tripping-stop 85 stands out of the path of the free end or tail of the clutch-dog 76. When, however, the said tripping-comb is rocked in the direction of the feed of the stalks, the said tripping-stop 85 will be moved into a position to engage the tail of the dog 76, and the said dog will then be thrown into an inoperative position, all as indicated by dotted lines in Fig. 5. In this dotted-line position of the parts the driving-lug 77 of the dog 76 is moved inward out of the path of the driving-rollers 74, so that the gear 73 is free to run ahead, while the disk 75, shaft 12, and feed-belts 14 and 74 are temporarily brought to a standstill. The tripping-comb will be rocked from its normal position into the dotted-line position indicated whenever the load of stalks on the feed-belt or conveyer 12 becomes piled high enough to strike against the lower edge of the trip-board portion of the said comb 45. It is further evident that as soon as the layer of stalks on the feed-belt 14 is again thinned down so as to pass freely under the said trip-board the spring 83 will throw the parts back into the normal position indicated by the full lines in Fig. 5, whereupon the feed-belts or conveyers 14 and 34 will again be driven. Under the normal feed of the stalks over the feed-belt 14 the teeth 46 of the tripping-comb engage to a greater or less extent with the stalks and serve to keep the same spread out while subject to the action of the beater. In view of the way in which the blades or wings 29 of the beater are projected from the body 25 thereof it will be seen that they are brought downward almost flatwise into engagement with the cornstalks and that their teeth 30 are then gradually brought into engagement with the upper stalks, which are projecting to the beater and are pressed tighter and tighter into engagement with the same as they move forward, thereby accelerating the movement of the engaged stalks. The plates or wings 29 are adapted to spring or yield slightly when thrown into engagement with a thick layer of stalks, and after they and their teeth 30 have performed their work on the stalks they are very quickly moved upward out of engagement therewith.

What I claim, and desire to secure by Letters Patent of the United States, is as follows:

1. The combination with a pair of snapping-rollers, of an endless conveyer or feed-belt for delivering the stalks thereto, and a rotary beater overlying the delivery end of said conveyer and having the backwardly-curved blades or wings 29 provided with teeth 30, substantially as described.

2. In a feeder of the character described, the combination with slotted guide-brackets having gear-teeth, of a beater-shaft provided at its ends with rigidly-secured pinions meshing with the teeth of said brackets, and a beater loosely mounted on said beater-shaft, whereby said beater is vertically adjustable always in a horizontal position, substantially as described.

3. The combination with a pair of snapping-rollers and a conveyer for delivering the stalks thereto spaced apart therefrom to form a throat through which the ears of corn may be dropped, of an inclined bearing-plate leading backward from said snapping-rollers, and a vibrating throat-clearing plate working on said bearing-plate and provided on its upper and lower portions, respectively, with upwardly and downwardly extended projections, substantially as described.

4. The combination with snapping-rollers and husking-rollers, and an endless conveyer or feed-belt delivering the stalks to the former but spaced apart therefrom to form an open throat, of the inclined reciprocating clearing-plate 15 driven by eccentrics and eccentric-straps and provided with the downturned cleats 16 and serrated upturned cleats 17, said parts operating substantially as described.

5. In a feeder of the character described, the combination with a pair of endless feed-belts or conveyers, and a band-cutter interposed between the same, of a drive for said two feed-belts involving a clutch, a pivoted tripping-blade or regulating-gate affording a governor overlying the delivery member of said feed-belts, and clutch-actuating connections subject to said tripping-plate or gate and serving to show said two feed-belts out of action without stopping the band-cutter whenever the stalks become overthickly piled on said delivery feed-belt, substantially as described.

6. The combination with snapping-rollers and husking-rollers, of an endless feed-belt or conveyer delivering to the former, a positively-driven overhead beater coöperating with said feed-belt to deliver the stalks to said snapping-rollers, a drive for said feed-belt involving a clutch, a pivoted tripping-plate or regulating-gate, affording a governor and overlying said feed-belt outward of said beater, and clutch-actuating connections subject to said tripping-plate or gate, for tripping said feed-belt out of action without stopping said beater, whenever the stalks become overthickly piled on said feed-belt, substantially as described.

7. In a feeder of the character described, the combination with an endless feed-belt or conveyer, of a drive therefor involving a clutch, a pivoted toothed tripping-comb overlying said feed-belt in position to be acted upon by the stalks and affording a governor, and clutch-actuating connections yieldingly held in one position, but subject to said tripping-comb for throwing said feed-belt out of action whenever the stalks become overthickly piled on said feed-belt, substantially as described.

In testimony whereof I affix my signature in presence of two witnesses.

CARL G. W. WERNICKE.

Witnesses:
A. E. CLARK,
MARTHA OLDING.